Figure 1:
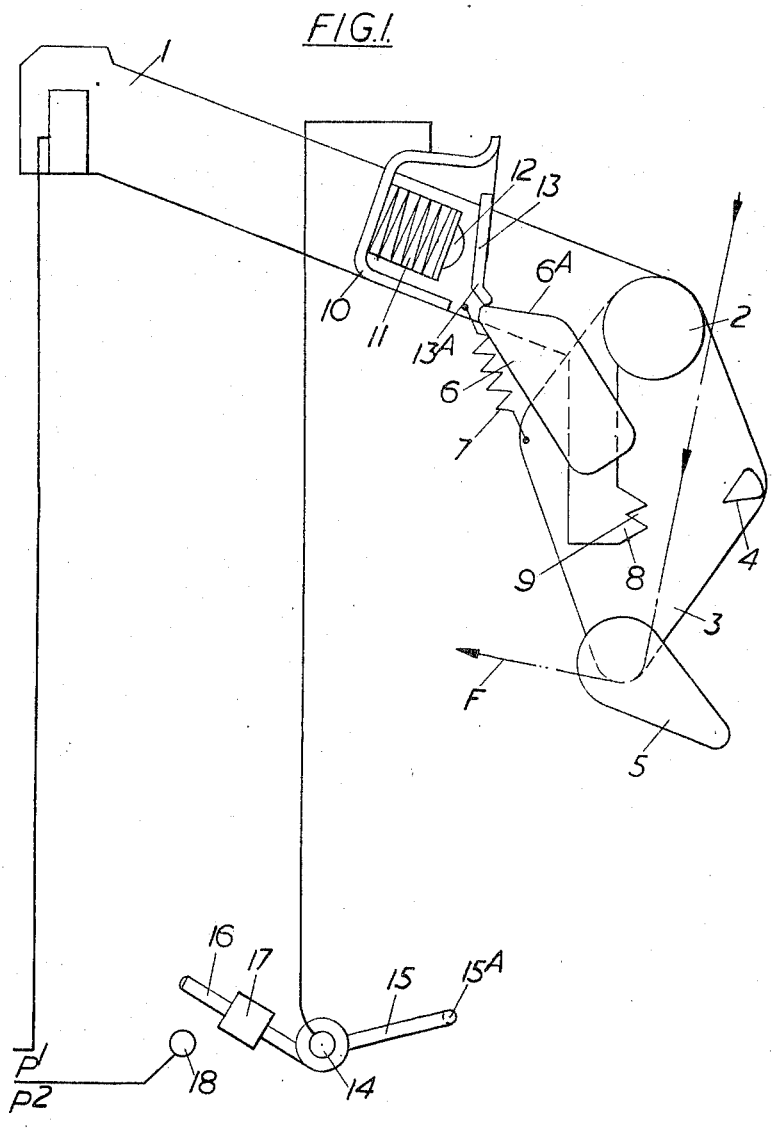

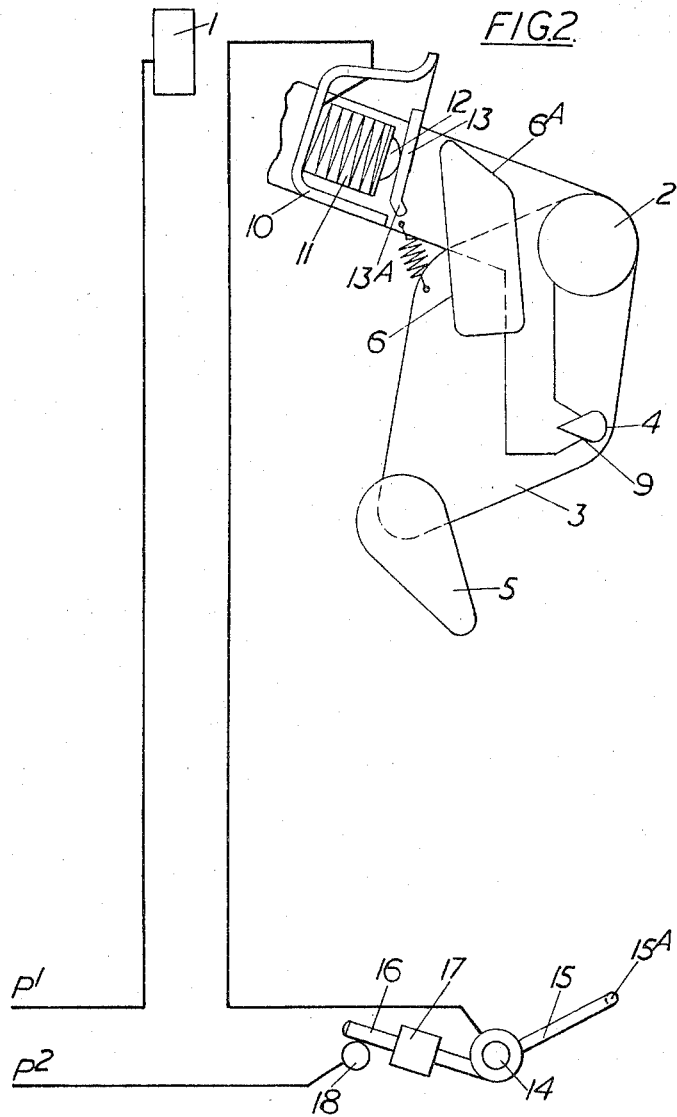

United States Patent Office 3,268,972
Patented August 30, 1966

1

3,268,972
STOP MECHANISM FOR STRETCHING DEVICES
Joseph Flori, Vaulx-en-Velin (Rhone), France, assignor to Textile & Chemical Research Company Limited, Vaduz, Liechtenstein, a corporation of Liechtenstein
Filed Mar. 5, 1964, Ser. No. 349,681
Claims priority, application France, Mar. 5, 1963, 926,888
1 Claim. (Cl. 28—71.4)

The present invention relates to a dependable and effective stop motion device intended more particularly for interrupting the feed of coarse yarn having a very high breaking load, such as tire cord of synthetic material undergoing stretching.

The problem of interrupting a coarse yarn of the aforesaid type for the purpose of preventing accidental winding of the yarn onto one of the stretching rolls is particularly difficult. Devices which operate by gripping and pulling cannot be used owing to the high pulling force which would be necessary, while devices comprising a blade which frays the yarn to be cut also cannot be used. However, even devices in which the yarn is cut by a guillotine knife, or by a shearing element, are not satisfactory in the case of coarse yarns of high tenacity.

The present invention relates to an electrically controlled stop motion comprising essentially a movable dihedral knife which wedges and severs the yarn in a groove in a fixed member which has a cross-section corresponding to that of the knife.

According to the present invention, the knife is disposed on a pivotable member which also supports a yarn guide and a bevelled plate. The said member is urged by a spring toward active severing position, but it is held fast in the inactive position by a stop member which consists of a flat latch, one section of which bears against the bevelled plate. When the yarn is broken, an electric circuit closes, an electromagnet is energized and the latch is attracted by the core of the electromagnet, the plate and thus the pivotable member being released. The invention will be more readily understood with reference to the following detailed description of a concrete embodiment which is illustrated by the accompanying two diagrammatic figures.

FIG. 1 illustrates the stop motion device embodying the present invention in the inactive position during operation of an apparatus for stretching a tire cord yarn; and FIG. 2 illustrates the stop motion device in its position after breakage of the tire cord yarn.

In the two figures, reference numeral 1 indicates a fixed metal support bar on the free end of which is mounted a pivot 2 for a diamond-shaped member 3. The latter supports a well-sharpened dihedral knife 4 of very hard material, which is produced, for example, by machining a cylindrical bar. The member 3 also supports a yarn guide assembly 5 which may consist of a "biconical guide" and associated guide members. Finally, the member 3 supports a plate 6, of which an upper branch 6A is bevelled.

The member 3 is urged upwards by a spring 7. The bar 1 also comprises a projection 8 with a lateral groove 9, of which the cross-sectional form is exactly the same as that of the knife 4. Also disposed on the bar 1 is a stirrup 10 which constitutes the support for a coil 11 enclosing a magnetizable core 12. Swingably mounted on the stirrup is a small plate 13 rounded at 13A on its free lower edge, which bears against the bevel 6A of the plate 6 and thus locks the latter.

In addition, the device comprises a lever-like feeler 14 with an arm 15, supporting a guide 15A, and another arm 16 loaded by a counterweight 17, which is optionally adjustable. The feeler consists of metal. When it is released due to breakage of the cord, the arm 16 falls onto a contact 18 which closes an alternating-current circuit operating at low voltage, for example at 24 volts, which is supplied by the poles $P^1$–$P^2$. This circuit comprises the support bar 1, which acts as earth, the winding of the coil 11, the feeler 14 and the contact 18.

The tire cord F coming from a supply package (not shown) passes over the yarn guide 5 in a number of turns in known manner, and then over the stretching rolls (not shown) and thereafter in such manner over the guide 15A of the feeler 14 that the arm 15 is lowered and the arm 16 is raised. On breakage of the tire cord, which generally occurs between the stretching rolls, the feeler 14 is released and the arm 16 falls onto the contact 18, thus closing the circuit (see FIGURE 2). The core 12 of the coil 11 is magnetized and attracts the latch 13, releasing the plate 6 and thus the member 3. The latter is urged by the spring 7 and pivots. Consequently, the knife 4 engages in the groove 9 in the fixed projection 8 and wedges and cuts the cord F, thus preventing the formation of a waste package on the first stretching roll.

This assembly, which is very dependable but nevertheless of simple construction, operates very reliably and gives entire satisfaction in practice, even in the case of heavy denier tire cords of polyamides.

What is claimed is:

In a stop mechanism for interrupting the feed of yarns of large diameter as they are fed to a stretching station, comprising a knife located in advance of said stretching station having a dihedral cross section and a fixed plate having a groove adapted to receive said knife, and having means for feeding said yarn beyond said knife and said fixed plate to said stretching station, the improvement which comprises a pivoted member carrying said knife, means for latching said knife in a retracted position, said latching means including a plate and a latch operatively associated therewith, said plate being supported by the pivoted member, spring means for advancing the knife to a severing position in advance of said stretching station, feeler means behind said stretching station actuated in response to breakage of the yarn thereby releasing the latch and thus advancing the knife to yarn severing position, the severing of the said yarn causing an interruption of the feed thereof to said stretching station, said stop mechanism further including an electromagnetic means adapted to actuate the latch to release said knife for severing the yarn at a point in advance of the stretching station.

References Cited by the Examiner
UNITED STATES PATENTS 2,398,473  4/1946  Stahl et al. _____ 83—370
2,734,335  2/1956  Saunders et al. _____ 19—.25

FOREIGN PATENTS 641,196  4/1928  France.
913,320  12/1962  Great Britain.
286,065  2/1953  Switzerland.

ROBERT R. MACKEY, *Primary Examiner.*